United States Patent
Nasrallah et al.

(10) Patent No.: US 9,849,438 B2
(45) Date of Patent: Dec. 26, 2017

(54) METHOD AND COMPOSITION FOR SEQUESTRATION OF ARSENIC

(71) Applicant: Dundee Sustainable Technologies Inc., Montreal (CA)

(72) Inventors: Khalil Nasrallah, Thetford Mines (CA); Bertrand Dubreuil, Trois-Rivières (CA); Jean-Marc Lalancette, Sherbrooke (CA); David Lemieux, Thetford Mines (CA)

(73) Assignee: Dundee Sustainable Technologies Inc., Montreal, Quebec (CA)

( * ) Notice: Subject to any disclaimer, the term of this patent is extended or adjusted under 35 U.S.C. 154(b) by 0 days.

(21) Appl. No.: 15/086,399

(22) Filed: Mar. 31, 2016

(65) Prior Publication Data
US 2016/0375423 A1 Dec. 29, 2016

Related U.S. Application Data

(60) Provisional application No. 62/183,248, filed on Jun. 23, 2015.

(51) Int. Cl.
| | |
|---|---|
| C03C 1/00 | (2006.01) |
| B01J 20/10 | (2006.01) |
| B09B 3/00 | (2006.01) |
| C03C 3/062 | (2006.01) |
| C03C 3/07 | (2006.01) |

(52) U.S. Cl.
CPC .......... B01J 20/103 (2013.01); B09B 3/0008 (2013.01); B09B 3/0083 (2013.01); C03C 1/002 (2013.01); C03C 3/062 (2013.01); C03C 3/07 (2013.01)

(58) Field of Classification Search
CPC ........ A62D 3/32; C03B 5/005; B09B 3/0008; B09B 3/0025; C03C 1/002; C03C 3/083
See application file for complete search history.

(56) References Cited

U.S. PATENT DOCUMENTS

| | | | |
|---|---|---|---|
| 5,769,961 A | 6/1998 | Peters et al. | |
| 8,998,790 B2 | 4/2015 | Lalancette et al. | |
| 2004/0204623 A1* | 10/2004 | Anderson | A62D 3/35 588/307 |
| 2009/0023973 A1 | 1/2009 | Lowery et al. | |
| 2009/0113937 A1 | 5/2009 | Carleer et al. | |
| 2011/0144408 A1 | 6/2011 | Gruber et al. | |
| 2014/0107389 A1* | 4/2014 | Lalancette | C03C 3/087 588/256 |

FOREIGN PATENT DOCUMENTS

| | | |
|---|---|---|
| CN | 102965517 | 3/2013 |
| WO | 2002094381 A1 | 11/2002 |

OTHER PUBLICATIONS

Thirunavukkarasu et al., Arsenic Removal from Drinking Water using Iron Oxide-Coated Sand, Springer Link, Water Air, and Soil Pollution, pp. 95-11, Issue 1-4, vol. 142, Jan. 2003.*
Outotec Ferric Arsenate Process, Sustainable Use of Earth's Natural Resources, Finland, Apr. 2014, www.outotec.com.
US-Gov-EPA 1311: Toxicity Characteristic Leaching Procedure (TCLP), CFR-2011, Title 40, vol. 26, Sec. 261.24, p. 67.
Bunsen, Robert, Biograpy, Facts and Pictures, May 10, 2015, pp. 1-2 of 11, http://www.famousscientists.org/robert-bunsen/.
Gallegos-Garcia et al, Arsenic Removal from Water by Adsorption using Iron Oxide Minerals as Adsorbents: A Review, Mineral Processing & Extractive Metall, 2012, pp. 301-315, Rev. 33.
American Elements, Iron(III) Arsenate, May 27, 2015, pp. 1 of 5, http://www.americanelements.com/feaso.html.
Machingawuta, N.C. et al., "Incorporation of arsenic in silicate slags as a disposal option," Trans. Instn. Min. Metall. (Sect. C: Mineral Process. Extr. Metall.) (1994) vol. 103, pp. C1-C8.
Twidwell. L.G., "Safe disposal of arsenic bearing flue dust by dissolution in smelter slags," Journal of Hazardous Materials (1983) vol. 8, pp. 85-90.
Mehta, A.K., "Investigation of New Techniques for Control of Smelter Arsenic Bearing Wastes," United States Environmental Protection Agency: Research and Development EPA-600/S2-81-049 (1981) pp. 1-6.
Bissen, M. et al, "Arsenic—a Review. Part II: Oxidation of Arsenic and its Removal in Water Treatment," Acta Hydrochim. Hydrobiol. (2003) vol. 31, No. 2, pp. 97-107.
Oscarson, D.W. et al, "Kinetics of Oxidation of Arsenite by Various Manganese Dioxides," Soil Sci. Soc. Am. J. (1983) vol. 47, pp. 644-648.
Feng, X.-H. et al, "Arsenite oxidation by three types of manganese oxides," Journal of Environmental Sciences (2006) vol. 18, No. 2, pp. 292-298.
International Search Report for PCT/CA2016/050390; dated May 9, 2016.

* cited by examiner

*Primary Examiner* — Elizabeth A. Bolden
(74) *Attorney, Agent, or Firm* — Nicholas A. Kees; Godfrey & Kahn, S.C.

(57) ABSTRACT

There is provided a method and composition for sequestration of arsenic, the method comprising melting an arsenic-containing material in the presence of iron oxide and glass, and yielding a resulting glass incorporating arsenic. The resulting glass has an arsenic content comprised in a range between 1 and 25% w/w and an iron content comprised in a range between 8 and 20% w/w.

14 Claims, No Drawings

METHOD AND COMPOSITION FOR SEQUESTRATION OF ARSENIC

CROSS REFERENCE TO RELATED APPLICATIONS

This application claims benefit of U.S. provisional application Ser. No. 62/183,248, filed on Jun. 23, 2015. All documents above are incorporated herein in their entirety by reference.

FIELD OF THE INVENTION

The present invention relates to sequestration of arsenic. More specifically, the present invention is concerned with vitrification of arsenic adsorbed on iron oxide.

BACKGROUND OF THE INVENTION

In 1834 Robert Bunsen discovered that arsenious oxide, a highly toxic material, could be rendered innocuous by contacting with iron oxide. The mechanism involved in this adsorption has been studied extensively as summarized in Gallegos-Garcia et al. (Mineral Processing & Extractive Metall. Rev. 33: 301-315, 2012). Various forms of iron oxides, such as hematite ($Fe_2O_3$), are reported to share structural oxygen atoms with arsenious oxides in angelellite-like local clusters.

These principles have been converted into industrial methods for the treatment of anthropogenic sources of arsenic such as flue dusts from smelters or naturally occurring contamination of water tables. The end products after adsorption of arsenic on hematite are found to be able to not release the arsenic, either trivalent or pentavalent as per standard acetic acid leaching procedure: EPA 1311 Toxicity Characteristic Leaching Procedure (TCLP). However, extreme pH condition or mechanical attrition can disperse this fixed arsenic in the environment.

Therefore, it has appeared desirable to complete this capture of arsenic by hematite by grouping the particulates obtained after adsorption into a macroscopic glass structure. Sequestration of arsenic by glass formation is a known procedure (U.S. Pat. No. 8,998,790). It was made possible by the thermal stability of calcium arsenate at a temperature where glass forming elements can lead to stable and homogeneous glass.

There is still a need in the art for a method and a composition for sequestration of arsenic.

The present description refers to a number of documents, the content of which is herein incorporated by reference in their entirety.

SUMMARY OF THE INVENTION

More specifically, in accordance with the present invention, there is provided a method for the vitrification of arsenic of an arsenic-containing material, comprising melting the arsenic-containing material in the presence of iron oxide and glass, and yielding a resulting glass incorporating arsenic.

There is further provided a stable glass composition, with an arsenic content comprised in a range between 1 and 25% w/w and an iron content comprised in a range between 8 and 20% w/w.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

There is generally provided a method comprising the incorporation of arsenic complexed on iron oxide into a homogeneous and stable glass phase and a stable glass composition sequestering arsenic as an iron/arsenic complex in the long-term.

In the arsenic-containing materials, the arsenic can be of various forms, such as pure arsenious oxide (95% w/w $As_2O_3$) or flue dusts from a copper smelter. The arsenious oxide ($As_2O_3$) content of the arsenic-containing materials is comprised between about 5 and about 95% w/w (unless otherwise indicated, the percentage are percentages in weights, i.e. % w/w).

The selected iron oxide-containing material comprises at least 15% w/w iron oxide. The iron oxide can take a range of forms, such as near pure (95% w/w) $Fe_2O_3$, or raw hematite, such as raw hematite found in Fermont, Qc, Canada for example with the following composition: $Fe_2O_3$: 45.6% w/w; $SiO_2$: 53.0% w/w: CaO: 0.8% w/w; $K_2O$: 0.25% w/w; NiO: 0.1% w/w; ZnO: 0.05% w/w.

The arsenic and the iron oxide-containing materials may be first reduced in size to particulates, for example to particulates 80% below 120 mesh, before mixing them together, using for example a ribbon mixer or any other powder mixer as known in the art, to obtain a mixture with a iron oxide ($Fe_2O_3$) content between 8 and 20% w/w.

A glass material, such as glass, recycled glass or glass-forming elements, with at least 40% w/w silica for example comprised in the range between 40 and 80% w/w, is then added, so as to obtain a mixture with the arsenic and the iron oxide-containing materials, with a target ratio of oxides as a starting feed for fusion. A typical starting feed for fusion may contain 17% w/w arsenious oxide ($As_2O_3$), 69% w/w recycled glass and 14% w/w iron oxide ($Fe_2O_3$) for example. Recycled glass has a typical composition as follows: Fe: 0.2% w/w; Mg, 0.9% w/w; Ca: 7.8% w/w; Si: 35.2%; Al: 1.0%; Na: 9.35%; K: 0.5%; B: 0.03% w/w for example.

In the starting feed for fusion, the arsenious oxide ($As_2O_3$) content may range from about 1% w/w to about 20% w/w, the loss of arsenic by volatilization during fusion remaining below 3.0% w/w and the acetic acid leaching of the resulting glass is at around 1 ppm As, well below the 5 ppm norm (EPA Code of Federal Regulations, Title 40—Protection of Environment, Volume 27, Section 261.24, EPA HW No. 1). As to the iron, under the form of iron oxide ($Fe_2O_3$), the content thereof in the starting feed for fusion may range from about 6% w/w to about 15% w/w without experimenting fusion problems or significant volatilization of arsenic during the fusion or during leaching of the vitrified arsenic.

The amount of glass in the starting feed for fusion is adjusted depending on the nature of the glass used, i.e., recycled glass or glass-forming elements, and of the composition of the arsenic and the iron oxide-containing materials used.

If hematite is used as the iron oxide source, with high silica content as described above in the case of the Fermont ore for example, small amounts of alkali or alkaline earth oxides ($Na_2O$, CaO, MgO) may be added so as to bring these silica impurities near a typical composition of recycled glass as given hereinabove (see Example 7 below for instance).

The raw mixture of arsenic, iron oxide and glass can be pelletized before melting, in order to limit dust emissions during the loading of the mixture in crucibles for example. Then fusion is done at atmospheric pressure at a temperature of at least 900° C., for example in a range comprised between 950° C. and 1250° C., and yields a black glass of very homogeneous composition resulting from a very homogenous blending of the components of the feed for fusion. Dust and fumes emitted during the fusion may be collected and recycled.

Without limitations to the scope of this invention, the following examples illustrate embodiments of the present invention.

Example 1

A mixture of 20.4 g of $As_2O_3$ (analytical grade), 51.0 g of recycled glass (80-120 mesh), 1.1 g $Na_2SiO_3$, 5.1 g $Na_2CO_3$ and 22.0 g $Fe_2O_3$ from an hematite raw ore containing 46.3% $Fe_2O_3$ and 52.5% $SiO_2$ was melted in a refractory crucible by heating in an electrically heated furnace for one and a half hour at 1250° C. After cooling, the resulting glass had the following composition: As: 15.4%; Si: 24.5%; Na: 7.6%; Ca: 4.1% and Fe 7.57%. This indicated a loss of 2.6% of the arsenic by volatilization in the course of the fusion. Standard leaching tests with acetic acid gave 3.07 ppm leaching, confirming the stability of this resulting glass.

Example 2

An experiment similar to Example 1 was conducted except that instead of using recycled glass, glass forming elements, i.e. silica and alkali, were used. The formulation of starting feed for fusion mixture was: $As_2O_3$: 19.0%; Recycled glass: 0%; $SiO_2$: 38%; $Na_2SiO_3$: 1.1%; $Na_2CO_3$: 21.0%; $Fe_2O_3$: 20%.

There was a 2.75% loss of arsenic during the glass formation, and the acetic acid leaching of the resulting glass, at 1.46 ppm, confirmed the stability of the resulting glass.

Example 3

An experiment was performed along similar conditions than those of Example 2, i. e. using glass forming elements, but with a starting feed for fusion mixture deprived of iron oxide, i.e. with the following starting feed for fusion: $As_2O_3$: 17.8%; recycled glass: 0%; $SiO_2$: 53.3%; $Na_2SiO_3$: 1.0%; $Na_2CO_3$: 25.8%; $Fe_2O_3$: 0%. An arsenic loss of 12.1% during fusion and a leaching by acetic acid of 426 ppm As were indications that the glass, obtained in absence of iron oxide in the starting feeding mixture, did not efficiently retain or stabilize arsenic.

Example 4

The procedure described in Example 1 was repeated, except that the temperature of fusion for glass formation was 900° C. instead of 1250° C. and the heating duration was two hours instead of one and a half hour. A glass was formed. This resulting glass showed a low release of arsenic when submitted to acetic acid leaching (1.5 ppm). However, because of its viscosity, it could not be casted and it retained significant amounts of bubbles, i.e. was not homogenous.

Example 5

Flue dusts from a copper smelter containing 76.4% $As_2O_3$; 14.6% PbO; 2.5% $Sb_2O_3$; 0.3% $TeO_2$ and 0.8% CuO were used as the arsenic-containing material. A mixture comprising 35 g of these flue dusts with 55 g of recycled glass, 2.9 g $Na_2CO_3$ and 20 g of $Fe_2O_3$, i.e. resulting in a starting feed for fusion comprising 31% w/w flue dust, 49% w/w recycled glass, 2.5% w/w $Na_2CO_3$ and 17.7% w/w $Fe_2O_3$, was prepared and melted at 1250° C. for one and a half hour. The resulting glass was submitted to lixiviation test with acetic acid. It was noted that the leaching of arsenic was low, at 1.2 ppm, and also that the other elements present in the starting feed for fusion were kept essentially sealed within the glass during the acetic leaching, with Pb at 0.53 ppm L, Sb at 0.18 ppm, Te at 0.01 ppm and Cu at 0.08 mg/L in the acetic leacheate.

Example 6

Using the parameters of Example 1, several samples of glasses were prepared in order to establish a ratio of arsenious oxide to hematite allowing obtaining a resulting glass that retains arsenic efficiently as per the acetic acid test. Starting with a starting feed for fusion containing 13% w/w As, 24.5% w/w Si, 6.5% w/w Na, 5.22% w/w Ca and 9.38% w/w Fe, the resulting glass had the following composition: As: 12.3% w/w; Si: 25.0% w/w; Na: 6.65% w/w; Ca: 5.34% w/w and Fe: 9.58% w/w. On treatment with acetic acid, 1.98 ppm of arsenic was leached out, well below the norm (EPA Code of Federal Regulations, Title 40—Protection of Environment, Volume 27, Section 261.24, EPA HW No. 1). Operating with a starting feed for fusion where the iron content was reduced to 6.03%, the leaching of arsenic from the resulting glass (6.14% Fe) was up to 4.5 ppm. Formulations still leaner in iron gave acetic leachates above 5% As. A level of at least about 8% iron in the starting feed for fusion, with about 13% As, was found to yield an efficient sequestration of arsenic.

Example 7

Flue dusts from a copper smelter having the following composition: As: 60.6%; Cd: 0.24%; Cu: 0.41%; Fe: 0.24%; Mg: 0.47%; Mn: 0.13%; Pb: 1.11%; Bi: 0.6%; Sb: 1.24%; Te: 0.25%; Se: 0.10%, S: 1.11% and Zn: 0.68% were used as the arsenic-containing material.

An homogeneous mixture of 5.14 Kg of flue dust, 6.43 Kg of raw hematite (40% $Fe_2O_3$), 9.86 Kg of silica (crystalline silica, 99% $SiO_2$) and 8.57 Kg of sodium carbonate $Na_2CO_3$ (light variety, i.e. containing contains less than 0.5% sodium chloride) were blended in a ribbon mixer with 12% of the weight of the solid as added water. Under these conditions, the solid mixture was pelletized into large (several centimeters, i.e. in a range between 1 and 10 cm) lumps. After drying at 100° C., these lumps could be loaded to a 300 liter pre-heated crucible heated at 1200° C. without significant dust emission. The fusion was completed at this temperature by heating for one hour in a gas fired furnace. The resulting glass was casted in a sand-lined mold.

The resulting glass weight was 24.5 Kg, and showing an As content of 10.96%. The test TCLP, EPA 1311 with acetic acid indicated a leaching at the level of 0.11 ppm, the norm being 5.0 ppm. This result confirms the very high stability of the confinement of arsenic in the glass. This stability was extended to other contaminants in the starting flue dust, the leachate from EPA 1311 containing 0.0015 ppm Cd, 0.11 ppm Cu, 0.018 ppm Pb, 0.0065 ppm Sb, 0.0043 ppm Se and 0.0060 ppm Te.

There is thus provided a method for the vitrification of arsenic, comprising the fusion of arsenic in the presence of iron oxide and glass.

The iron oxide may be hematite or a hematite ore containing more than 15% $Fe_2O_3$. The glass is a glass or recycled glass or glass formed in situ from silica and alkalis and containing at least 40% w/w silica, for example from 40 to 80% w/w silica. The source of arsenic may be oxides of arsenic, or flue dusts containing from 5% to 95% w/w $As_2O_3$ along with other contaminants such as arsenides, lead, antimony, bismuth, cadmium, selenium or tellurium compounds, or combinations of these elements. These compounds can be sequestered.

The mixture of arsenic, iron oxide and high silica glass, i.e. the feed for fusion, comprises between 1 and 20% w/w $As_2O_3$, for example about 13% w/w $As_2O_3$, and between 6 and 15% w/w $Fe_2O_3$, for example between 8 and 15% w/w $Fe_2O_3$.

The feed for fusion is melted at a temperature of at least 900° C., for example in a range comprised in a range between 950 and 1250° C., at atmospheric pressure, for about 1 hour, to allow formation of an homogeneous glass. Glass at the end of fusion is 50-60% of the total weight, the remaining being mainly $As_2O_5$, $Fe_2O_3$, PbO and CaO.

The iron content in the resulting glass varies from about 8 to about 20% w/w, and its arsenic content, under the form of arsenic pentoxide $As_2O_5$, varies from about 1 to about 25% w/w, for example between 1 and 20% w/w.

While it was believed in the art that ferric arsenate ($FeAsO_4$), a ferric salt of arsenic, decomposes at melting, with a boiling point at 614° C. as stated by a supplier American Elements, Inc. for example, the present invention provides glass formation of an iron oxide/arsenic oxide complex at temperatures required for glass formation without decomposition nor large volatilization of arsenic.

Thus incorporation of arsenic-iron oxide adsorbate into a glass structure is obtained, which allows long-term efficient sequestration of the arsenic and without risk of dispersion either by chemical leaching or mechanical attrition for example.

The scope of the claims should not be limited by the embodiments set forth in the examples, but should be given the broadest interpretation consistent with the description as a whole.

What is claimed is:

1. A method for the vitrification of arsenious oxide from an arsenic-containing material, comprising selecting an iron oxide-containing material containing at least 15% w/w iron oxide, mixing the arsenic-containing material with the iron oxide-containing material and a glass material into a mixture, and melting the mixture, yielding a resulting glass incorporating arsenic as arsenic oxide.

2. The method of claim 1, comprising selecting a glass material with at least 40% w/w silica.

3. The method of claim 1, wherein said melting the mixture is performed at a temperature comprised in a range from 950 through 1250° C. inclusive, at atmospheric pressure.

4. The method of claim 1, comprising selecting an iron oxide-containing material containing at least 15% w/w iron oxide; selecting a glass material with at least 40% w/w silica; mixing the arsenic-containing material, the iron oxide-containing material and the glass material into a mixture and melting the mixture at a temperature of at least 900° C., at atmospheric pressure, wherein said selecting the iron oxide-containing material comprises selecting one of: i) hematite and ii) hematite ore.

5. The method of claim 1, comprising selecting an iron oxide-containing material containing at least 15% w/w iron oxide; selecting a glass material with at least 40% w/w silica; mixing the arsenic-containing material, the iron oxide-containing material and the glass material into a mixture and melting the mixture at a temperature of at least 900° C., at atmospheric pressure, wherein said selecting the glass material comprises selecting one of: i) high silica glass, ii) recycled glass and iii) glass forming elements.

6. The method of claim 1, comprising selecting an iron oxide-containing material containing at least 15% w/w iron oxide; selecting a glass material with at least 40% w/w silica; mixing the arsenic-containing material, the iron oxide-containing material and the glass material into a mixture and melting the mixture at a temperature of at least 900° C., at atmospheric pressure, wherein the mixture comprises from 1 through 20% inclusive w/w arsenious oxide and from 6 through 15% inclusive w/w iron oxide.

7. The method of claim 1, comprising selecting an iron oxide-containing material containing at least 15% w/w iron oxide; selecting a glass material with at least 40% w/w silica; mixing the arsenic-containing material, the iron oxide-containing material and the glass material into a mixture and melting the mixture at a temperature of at least 900° C., at atmospheric pressure, wherein the arsenic-containing material comprises arsenious oxide in a range from 5 through 95% inclusive w/w.

8. The method of claim 1, comprising selecting an iron oxide-containing material containing at least 15% w/w iron oxide; selecting a glass material with at least 40% w/w silica; mixing the arsenic-containing material, the iron oxide-containing material and the glass material into a mixture and melting the mixture at a temperature of at least 900° C., at atmospheric pressure, wherein the arsenic-containing material comprises arsenious oxide in a range from 5 through 95% inclusive w/w and contaminants, the method yielding vitrification of the contaminants into the resulting glass.

9. The method of claim 1, comprising selecting an iron oxide-containing material containing at least 15% w/w iron oxide; selecting a glass material with at least 40% w/w silica; mixing the arsenic-containing material, the iron oxide-containing material and the glass material into a mixture and melting the mixture at a temperature of at least 900° C., at atmospheric pressure, wherein the arsenic-containing material comprises arsenious oxide in a range from 5 through 95% inclusive w/w and contaminants, the method yielding vitrification of the contaminants into the resulting glass, the contaminants being at least one of: arsenides, lead, antimony, bismuth, cadmium, selenium or tellurium compounds, and combinations thereof.

10. The method of claim 1, comprising selecting an iron oxide-containing material containing at least 15% w/w iron oxide; selecting a glass material with at least 40% w/w silica; mixing the arsenic-containing material, the iron oxide-containing material and the glass material into a mixture and melting the mixture at a temperature of at least 900° C., at atmospheric pressure, wherein the resulting glass comprises arsenic oxide in a range from 1 through 25% inclusive w/w.

11. The method of claim 1, comprising selecting an iron oxide-containing material containing at least 15% w/w iron oxide; selecting a glass material with at least 40% w/w silica; mixing the arsenic-containing material, the iron oxide-containing material and the glass material into a mixture and melting the mixture at a temperature of at least 900° C., at atmospheric pressure, wherein the resulting glass comprises arsenic oxide in a range from 1 through 20% inclusive w/w.

12. The method of claim 1, comprising selecting an iron oxide-containing material containing at least 15% w/w iron oxide; selecting a glass material with at least 40% w/w silica; mixing the arsenic-containing material, the iron oxide-containing material and the glass material into a mixture and melting the mixture at a temperature of at least 900° C., at atmospheric pressure, wherein the resulting glass comprises iron oxide in a range from 8 through 20% inclusive w/w.

13. The method of claim 1, wherein the mixture comprises from 1 through 20% inclusive w/w arsenious oxide and from 6 through 15% inclusive w/w iron oxide and said melting the mixture is performed at a temperature comprised in a range from 950 through 1250° C. inclusive, at atmospheric pressure.

14. The method of claim 1, wherein the arsenic-containing material comprises arsenious oxide in a range from 5 through 95% inclusive w/w, said method comprising selecting a glass material comprising silica in a range from 40 through 80% inclusive w/w; the resulting glass comprising from 1 through 25% inclusive w/w arsenic oxide.

* * * * *